(12) United States Patent
Izumi

(10) Patent No.: US 9,798,160 B2
(45) Date of Patent: Oct. 24, 2017

(54) IMAGE STABILIZATION APPARATUS THAT REDUCES BLURRING OF SUBJECT IMAGE AND OPTICAL DEVICE

(71) Applicant: CANON KABUSHIKI KAISHA, Tokyo (JP)

(72) Inventor: Mitsuhiro Izumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/175,896

(22) Filed: Jun. 7, 2016

(65) Prior Publication Data

US 2016/0357027 A1   Dec. 8, 2016

(30) Foreign Application Priority Data

Jun. 8, 2015  (JP) ................. 2015-115594

(51) Int. Cl.
  *G02B 27/64* (2006.01)
  *H04N 5/232* (2006.01)
  *G02B 7/02* (2006.01)

(52) U.S. Cl.
  CPC .......... *G02B 27/646* (2013.01); *G02B 27/64* (2013.01); *H04N 5/232* (2013.01); *H04N 5/23248* (2013.01); *G02B 7/023* (2013.01)

(58) Field of Classification Search
  CPC .. G02B 27/64; G02B 27/646; H04N 5/23248; H04N 5/232
  USPC ................................................ 359/557, 554
  See application file for complete search history.

(56) References Cited

U.S. PATENT DOCUMENTS

| | | | | |
|---|---|---|---|---|
| 6,064,827 A * | 5/2000 | Toyoda | ................ | G02B 27/646 396/55 |
| 2010/0166401 A1* | 7/2010 | Akutsu | ................ | G02B 27/646 396/55 |
| 2010/0309324 A1* | 12/2010 | Shirono | ............. | H04N 5/23248 348/208.11 |
| 2011/0164869 A1* | 7/2011 | Kudoh | ..................... | G03B 5/02 396/349 |
| 2011/0292509 A1* | 12/2011 | Yasuda | ................ | G02B 27/646 359/554 |
| 2012/0218429 A1* | 8/2012 | Suzuka | ................ | G02B 27/646 348/208.11 |
| 2013/0170039 A1* | 7/2013 | Miyoshi | ............... | G02B 27/646 359/554 |

(Continued)

FOREIGN PATENT DOCUMENTS

JP          3969927 B2    9/2007

*Primary Examiner* — William R Alexander
(74) *Attorney, Agent, or Firm* — Cowan, Liebowitz & Latman, P.C.

(57) ABSTRACT

An image stabilization apparatus which reduces variations in performance with surface accuracy of a rolling surface for rolling members. A movable unit holds an optical element and is rotatable about a first rotational axis perpendicular to an optical axis of the optical element and a second rotational axis perpendicular to the optical axis and the first formational axis through rolling of the rolling members. With the second rotational axis coinciding with a center of the rolling surface, a first ratio of the first moving range of the rolling members to the first rotational range of the movable unit is smaller than a second ratio of the second moving range of the rolling members to the second rotational range of the movable unit.

15 Claims, 9 Drawing Sheets

(56) References Cited

U.S. PATENT DOCUMENTS

| | | | | |
|---|---|---|---|---|
| 2015/0103195 A1* | 4/2015 | Kwon | ............... | H04N 5/2253 348/208.12 |
| 2015/0110482 A1* | 4/2015 | Suzuka | ............... | G02B 27/646 396/55 |
| 2015/0146025 A1* | 5/2015 | Bang | ............... | G02B 7/08 348/208.99 |
| 2015/0195460 A1* | 7/2015 | Yasuda | ............... | G02B 27/646 348/208.11 |
| 2015/0237259 A1* | 8/2015 | Yasuda | ............... | G02B 27/646 348/208.11 |
| 2015/0296112 A1* | 10/2015 | Park | ............... | H04N 5/2257 348/208.7 |
| 2015/0373272 A1* | 12/2015 | Lim | ............... | H04N 5/23287 348/208.11 |

\* cited by examiner

IMAGE STABILIZATION APPARATUS THAT REDUCES BLURRING OF SUBJECT IMAGE AND OPTICAL DEVICE

BACKGROUND OF THE INVENTION

Field of the Invention

The present invention relates to an image stabilization apparatus to, for example, reduce blurring of a subject image and an optical device.

Description of the Related Art

Some lens barrels of digital cameras or the like have an image stabilization apparatus that reduces blurring of a subject image, which is formed on a light-incident surface, by moving all or a part of a shooting optical system in response to externally-applied vibration.

For example, for an image stabilization apparatus constructed such that a movable unit which holds a corrective lens moves on a plane perpendicular to an optical axis, there has been proposed a technique to set a range over which a restriction unit restricts movement of a ball sandwiched between a fixed unit and the movable unit to a half of a maximum amount of movement of the movable unit.

According to this proposal, when the movable unit lies at a central position, the ball is allowed to move without coming into contact with the restriction unit while the movable unit is moving as long as the ball lies near the central position. When the ball is off the central position, the position of the ball when the movable unit lies at the central position falls within a predetermined range near the central position by carrying out a resetting operation to bring the ball back to the central position (see Japanese Patent No. 3,969,927).

Japanese Patent No. 3,969,927 above is based on the principle that the amount of movement of the ball is a half of the amount of movement of the movable unit. However, in an image stabilization apparatus in which a movable unit which holds a corrective lens rotates about a rotational axis perpendicular to an optical axis, not on a plane perpendicular to the optical axis, a ball sandwiched between a fixed unit and the movable unit moves on a spherical rolling surface.

In this case, the amount of movement of the ball varies with directions of the rotational axis, and hence in a direction of the rotational axis in which the amount of movement of the ball is small, the ball cannot be reset to a central position or its vicinity even by performing a resetting operation, and hence the range over which the ball possibly lies after the resetting operation is wide.

For this reason, assuming that a position of the ball when the movable unit lies at the central portion is an initial position, the range of the initial position is wide. When the range of the initial range is wide, an image stabilizing operation tends to be affected by the surface accuracy of a rolling surface for the ball, and performance of the image stabilization apparatus may be unstable.

SUMMARY OF THE INVENTION

The present invention provides an image stabilization apparatus in which a movable unit rotates about a rotational axis, which is perpendicular to an optical axis, through rolling of rolling members, and which reduces variations in performance with surface accuracy of a rolling surface for the rolling members by reducing a range of initial position of the rolling member after performing a resetting operation, and an optical device.

Accordingly, the present invention provides An image stabilization apparatus comprising a fixed unit, a movable unit configured to hold an optical element and be supported so as to be rotatable about a first rotational axis, which is perpendicular to an optical axis of the optical element, and a second rotational axis, which is perpendicular to the optical axis and perpendicular to the first rotational axis, with respect to the fixed unit through a plurality of rolling members, a rotation restriction unit configured to be provided in the fixed unit and restrict rotation of the movable unit, and a movement restriction unit configured to be provided around a rolling surface for the rolling members and restrict movement of the rolling members, wherein in a state where the second rotational axis coincides with a center of the rolling surface as seen in a direction of the optical axis, assuming that a range over which the rolling members are movable before the movement restriction unit restricts movement of the rolling members moving in a direction of the first rotational axis is a first moving range, and a range over which the movable unit is rotatable before the rotation restriction unit restricts rotation of the movable unit about the second rotational axis is a first rotational range, a range over which the rolling members are movable before the movement restriction unit restricts movement of the rolling members moving in a direction perpendicular to a direction of the first moving range is a second moving range, and a range over which the movable unit is rotatable before the rotation restriction unit restricts rotation of the movable unit about the first rotational axis is a second rotational range, and a ratio of the first moving range to the first rotational range is a first ratio, and a ratio of the second moving range to the second rotational range is a second ratio, the second ratio is greater than the first ratio.

According to the present invention, in the image stabilization apparatus in which the movable unit rotates about the rotational axis, which is perpendicular to an optical axis, through rolling of the rolling members, variations in performance with surface accuracy of the rolling surface for the rolling members are reduced by reducing a range of initial position of the rolling member after performing a resetting operation.

Further features of the present invention will become apparent from the following description of exemplary embodiments (with reference to the attached drawings).

DESCRIPTION OF THE EMBODIMENTS

Hereafter, embodiments of the present invention will be described with reference to the drawings.

Figure 1:
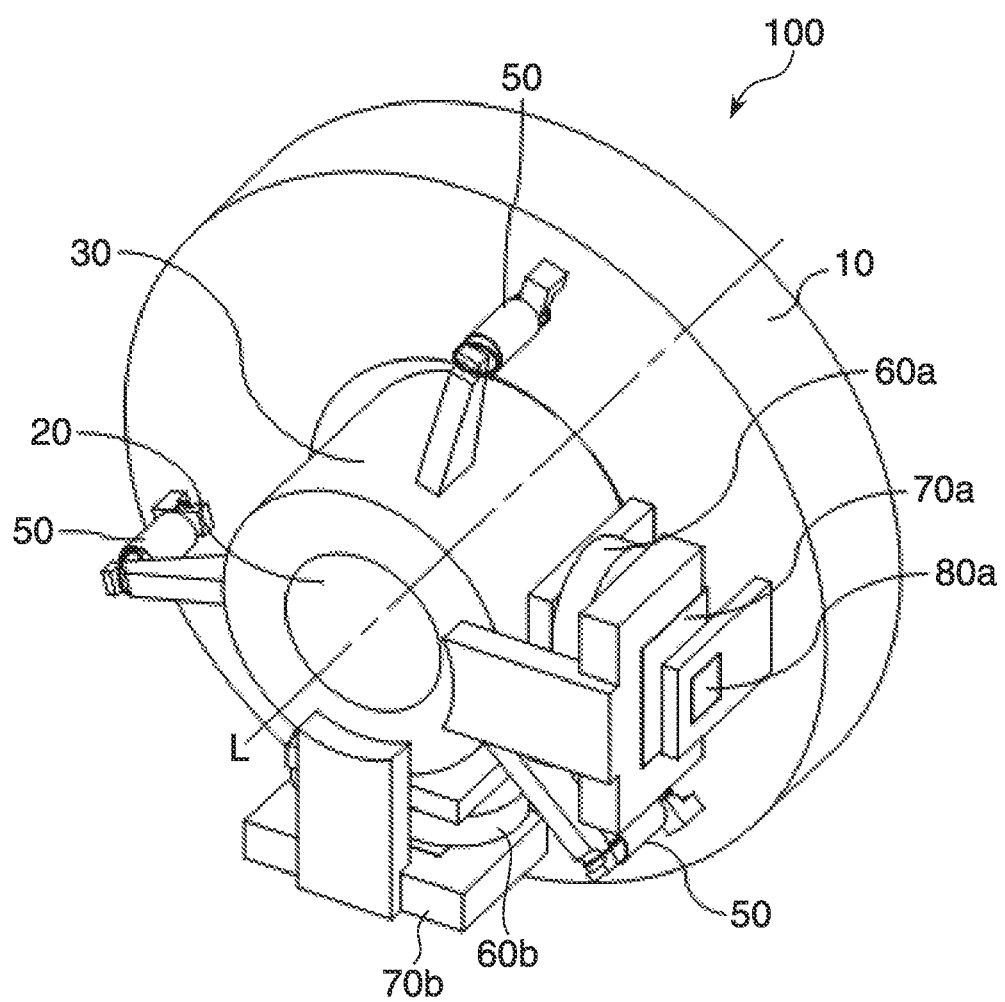
FIG. 1 is a perspective view showing an image stabilization apparatus according to a first embodiment of the present invention as seen from front (subject side).
Figure 2A:
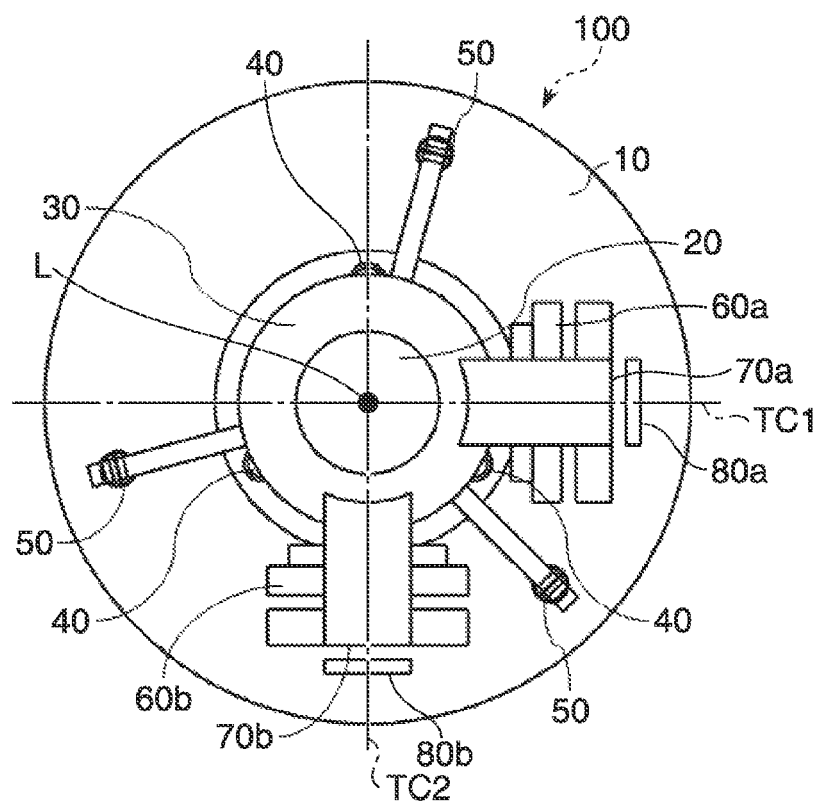
FIG. 2A is a view showing the image stabilization apparatus as seen from front in a direction of an optical axis.

FIG. 1 is a perspective view showing an image stabilization apparatus 100 according to a first embodiment of the present invention as seen from front (subject side). FIG. 2A is a view showing the image stabilization apparatus 100 as seen from front in a direction of an optical axis, and FIG. 2B is a right side view of FIG. 2A.

Figure 2B:
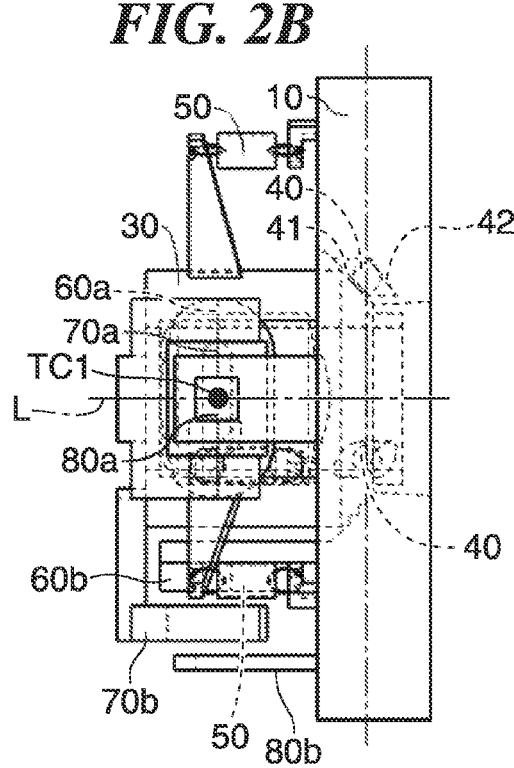
FIG. 2B is a right side view of FIG. 2A.

Referring to FIGS. 1, 2A, and 2B, the image stabilization apparatus 100 according to the present embodiment has a movable unit 30 which holds an optical element 20 such as a lens. The movable unit 30 is rotatable about two rotational axes TC1 and TC2 which are not parallel to (for example, perpendicular to) an optical axis L of a lens barrel, not shown. Here, the rotational axis TC1 corresponds to an exemplary first rotational axis of the present invention, and the rotational axis TC2 corresponds to an exemplary second rotational axis of the present invention.

Tilting the movable unit 30 a predetermined amount with respect to the optical axis L moves the optical element 20 in a direction perpendicular to the optical axis L. As a result, a bundle of light rays that has passed through the image stabilization apparatus 100 is corrected for vibration and aberration. It should be noted that the movable unit 30 may hold an image pickup element as well as the optical element 20. In this case, rotating the optical element and the image pickup element integrally corrects for blurring of an image.

The movable unit 30 is urged in the direction of the optical axis by three urging springs 50 disposed at substantially regular intervals around the optical axis L. In the present embodiment, the urging springs 50, each of which is comprised of a helical extension spring, are placed substantially parallel to the optical axis L and has one end thereof hooked on the movable unit 30 and the other end thereof hooked on a fixed unit 10 disposed on a rear side of the movable unit 30. The movable unit 30 is disposed substantially parallel to the optical axis L by striking a balance among the three urging springs 50.

A plurality of balls 40, which are exemplary rolling members, are sandwiched between the movable unit 30 and the fixed unit 10. As a result, the movable unit 30 is supported so as to be rotatable about the rotational axes TC1 and TC2 with respect to the fixed unit 10 through rolling of the plurality of balls 40.

The balls 40 are placed at three locations at substantially regular intervals in a circumferential direction of the movable unit 30, and as shown in FIG. 2B, they are sandwiched such that they are able to roll between a rolling surface 41 on the movable unit 30 side and a rolling surface 42 on the fixed unit 10 side. The rolling surface 41 has a convex spherical shape, and the rolling surface 42 has a concave spherical shape. Spherical centers of the rolling surface 41 and the rolling surface 42 correspond to an intersection point of the rotational axis TC1 and the rotational axis TC2 passing through the optical axis L.

The rotational axis TC1 is disposed perpendicularly to the optical axis L, and the rotational axis TC2 is disposed perpendicularly to the optical axis L and perpendicularly to the rotational axis TC1. As a result, the movable unit 30 is rotated in an arbitrary direction with centers of the rotational axes TC1 and TC2 fixed while the balls 40 are held in the state of being sandwiched between the rolling surface 41 and the rolling surface 42. It should be noted in the present embodiment, that positions of the rotational axes TC1 and TC2 of the movable unit 30 in the direction of the optical axis are fixed but may be variable.

For example, rolling surfaces with different radiuses and a plurality of sets of balls 40 are prepared at a plurality of locations of the fixed unit 10 and the movable unit 30, and by rotating the rolling surface of the movable unit 30 about the optical axis L, the balls 40 to be sandwiched are switched so that the positions of the rotational axes TC1 and TC2 in the direction of the optical axis can vary.

The fixed unit 10 has, in a circumferential direction of the movable unit 30, two coils 60a and 60b which are circumferentially spaced 90 degrees from each other and opposed to an outer peripheral surface of the movable unit 30. The coil 60a is wound around the rotational axis TC1 and has a long straight portion in a direction perpendicular to the rotational axis TC1 and perpendicular to the optical axis L. The coil 60b is wound around the rotational axis TC2 and has a long straight portion in a direction perpendicular to the rotational axis TC2 and perpendicular to the optical axis L.

On a side of the coils 60a and 60b opposite to an outer peripheral surface of the movable unit 30, magnets 70a and 70b are provided in opposed relation to the coils 60a and 60b, respectively. The magnets 70a and 70b are provided integrally with the movable unit 30 (see FIG. 3B) and placed such that permanent magnet fields generated on the magnets 70a and 70b pass through the straight portions of the coils 60a and 60b. Controlling the passage of electric current through the two coils 60a and 60b by a control unit, not shown, generates a Lorentz force between the two coils 60a and 60b and the respective magnets 70a and 70b and causes the movable unit 30 to rotate about the rotational axes TC1 and TC2.

The fixed unit 10 has magnet sensors 80a and 80b which are provided in opposed relation to surfaces of the magnets 70a and 70b, respectively, opposite to the coils 60a and 60b. The magnet sensors 80a and 80b detect movement of the magnets 70a and 70b in the direction of the optical axis. Specifically, when the movable unit 30 rotates, the magnet sensors 80a and 80b detect the amount of movement of the magnets 70a and 70b integral with the movable unit 30, and based on the detection result, the control unit, not shown, determines a rotational direction and a rotational amount of the movable unit 30. It should be noted that although in the present embodiment, the movable unit 30 is provided with the magnets 70a and 70b, the movable unit 30 may be provided with the coils 60a and 60b. In this case, wiring that supplies electric power to the coils 60a and 60b is needed.

Figure 3A:
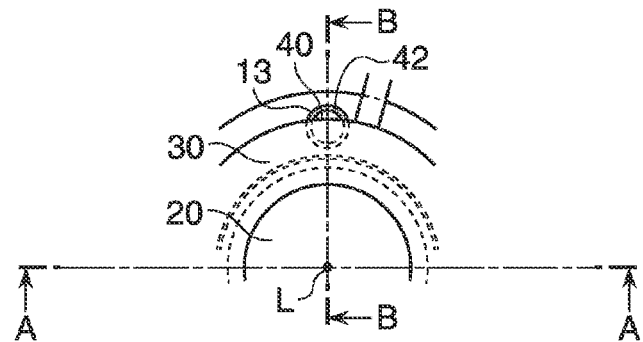
FIG. 3A is a view showing in part the image stabilization apparatus as seen in the direction of the optical axis.
Figure 3B:
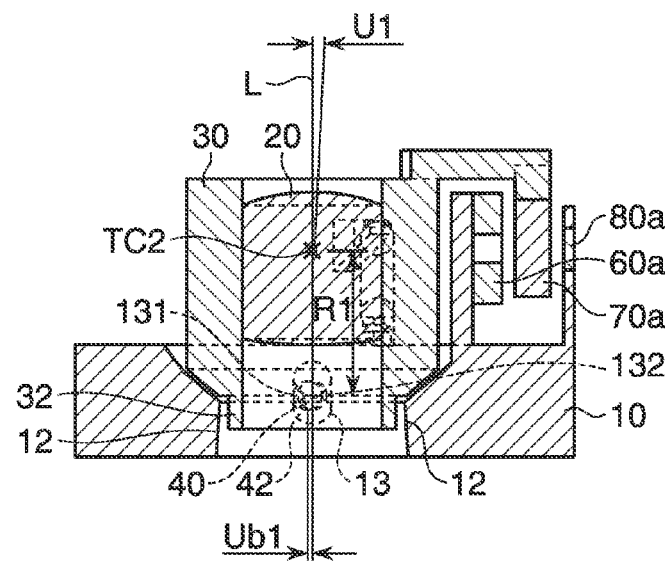
FIG. 3B is a cross-sectional view of FIG. 3A taken along line A-A of FIG. 3A.
Figure 3C:
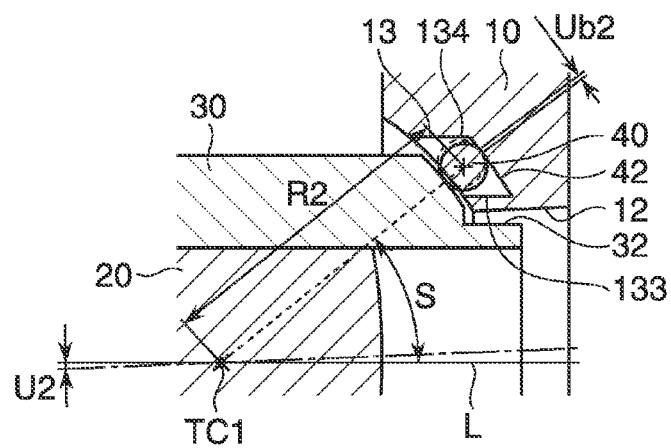
FIG. 3C is a cross-sectional view of FIG. 3A taken along line B-B of FIG. 3A.

Referring to FIGS. 3A to 3C, the amount of movement of the ball 40 relative to the amount of rotation of the movable unit 30 will now be described. FIG. 3A is a view showing in part the image stabilization apparatus 100 as seen in the direction of the optical axis, FIG. 3B is a cross-sectional view of FIG. 3A taken along line A-A of FIG. 3A, and FIG. 3C is a cross-sectional view of FIG. 3A taken along line B-B of FIG. 3A.

Referring to FIG. 3B, where the amount of rotation of the movable unit 30 rotating about the rotational axis TC2 is U1, and the amount of movement of the ball 40 moving in response to the rotation of the movable unit 30 is Ub1, an equation (1) below holds.

$$Ub1 = R1 \cdot U1/2 \quad (1)$$

Here, R1 designates the distance from the rotational axis TC2 to a center of the ball 40. The amount of movement Ub1 of the ball 40 designates the amount by which the ball 40 has moved in an arc pattern on the rolling surface 42 on the fixed unit 10 side. In the following description as well, the amount of movement of the ball 40 represents the amount of movement in an arc pattern. Since the ball 40 rolls between the rolling surface 42 on the fixed unit 10 side and rolling surface 41 on the movable unit 30 side, the ball 40 rotates about the rotational axis TC2 by U1/2 which corresponds to a half of the amount of rotation U1 of the movable unit 30. The above equation (1) is obtained by converting this into the amount of movement Ub1 of the ball 40.

It should be noted that in the present embodiment, the unit of the amount of movement Ub1 and the distance R1 are, for example, [mm], and the unit of the rotational amount U1 is, for example, [rad]. Likewise, in the following description as well, the unit of the length is [mm], and the unit of the angle is [rad].

Referring to FIG. 3C, where the amount of rotation of the movable unit 30 rotating about the rotational axis TC1 is U2, and the amount of movement of the ball 40 moving in response to the rotation of the movable unit 30 is Ub2, an equation (2) below holds.

$$Ub2 = R2 \cdot U2/2 \quad (2)$$

Here, R2 designates the distance from the rotational axis TC1 to the center of the ball 40. Where the angle formed by a line, which connects the rotational axis TC1 to the center of the ball 40, and the optical axis L is S, the relationship between the distance R2 and the distance R1 in FIG. 3B is expressed by an equation (3) below.

$$R1 = R2 \cdot \cos(S) \quad (3)$$

When the above equation (3) is substituted into the above equation (1), an equation (4) below holds.

$$Ub1 = R2 \cdot U1 \cdot \cos(S)/2 \quad (4)$$

Here, a location where the ball 40 is placed will be discussed. When the ball 40 is placed on the optical axis L, it interrupts a bundle of light rays that have passed through the optical element 20, and therefore, the ball 40 cannot be placed on the optical axis L. For this reason, the ball 40 is placed so that the angle S can always be greater than 0. The ball 40 is urged toward the fixed unit 10 by the urging spring 50. The location where the ball 40 is placed translates into the following range in terms of a cosine function: cos (S)<1.

Here, where the above equation (2) and the above equation (4) are translated into the ratio of the amount of movement of the ball 40 to the amount of rotation of the movable unit 30, an equation (5) and an equation (6) below hold.

$$Ub1/U1 = R2 \cdot \cos(S)/2 \quad (5)$$

$$Ub2/U2 = R2/2 \quad (6)$$

When the expression cos(S)<1 is applied to the above equation (5) and the above equation (6), an equation (7) below holds.

$$Ub1/U1 < Ub2/U2 \quad (7)$$

In the above equation (7), Ub1/U1 represents the ratio of the amount of movement of the ball 40 to the amount of rotation of the movable unit 30 about the rotational axis TC2 coinciding with the center of the rolling surface 42 on the fixed unit 10 side as seen in the direction of the optical axis L. Ub2/U2 represents the ratio of the amount of movement of the ball 40 to the amount of rotation of the movable unit 30 about the rotational axis TC1 perpendicular to the rotational axis TC2. As is clear from the above equation (7), Ub2/U2 is greater than Ub1/U1.

Figure 4A:
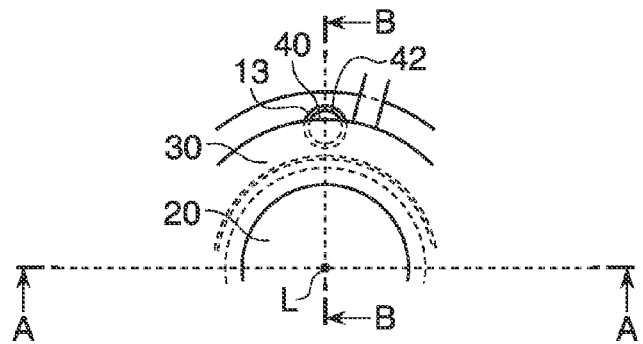
FIG. 4A is a view showing in part the image stabilization apparatus as seen in the direction of the optical axis.
Figure 4B:
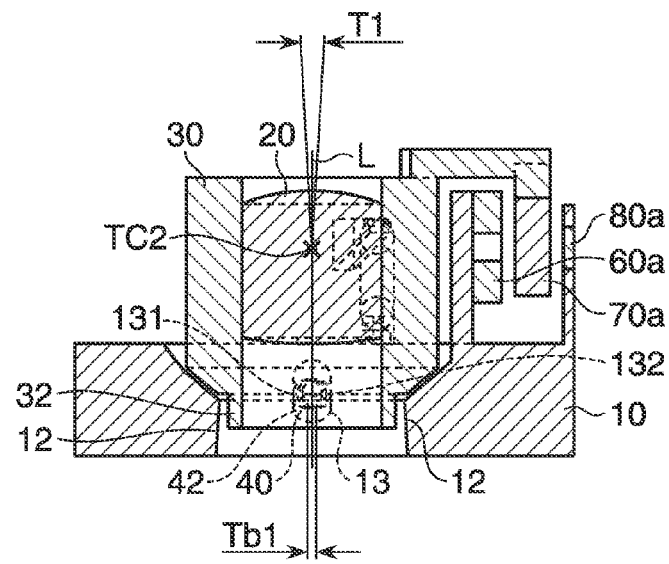
FIG. 4B is a cross-sectional view of FIG. 4A taken along line A-A of FIG. 4A.
Figure 4C:
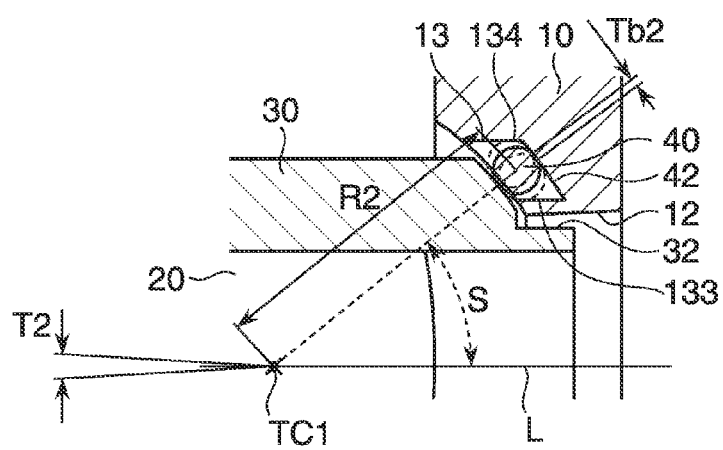
FIG. 4C is a cross-sectional view of FIG. 4A taken along line B-B of FIG. 4A.

Referring next to FIGS. 4A to 4C, a description will be given of a rotation restricted unit 32 of the movable unit 30 and a movement restriction unit 13 of the ball 40.

FIG. 4A is a view showing in part the image stabilization apparatus 100 as seen in the direction of the optical axis, FIG. 4B is a cross-sectional view of FIG. 4A taken along line A-A of FIG. 4A, and FIG. 4C is a cross-sectional view of FIG. 4A taken along line B-B of FIG. 4A.

As shown in FIGS. 4B and 4C, the fixed unit 10 is provided with the movement restriction unit 13 which restricts movement of the ball 40. The movement restriction unit 13 restricts movement of the ball 40, which rolls on the rolling surface 42 on the fixed unit 10 side, in all directions to a predetermined range. As shown in FIG. 4A, the movement restriction unit 13 has substantially a round shape along a circumference of the rolling surface 42 as seen in the direction of the optical axis L. Thus, when the fixed unit 10 is a resin molded product, it is thus possible to easily produce the movement restriction unit 13 using a die, a punching direction of which is the direction of the optical axis L, or the like. It should be noted that although in the present embodiment, the movement restriction unit 13 is provided in the fixed unit 10, the movement restriction unit 13 may be provided in the movable unit 30.

A description will now be given of how the movement restriction unit 13 restricts the movement range of the ball 40. Referring to FIG. 4B, the rotational axis TC2 is disposed in a manner coinciding with a center of the rolling surface 42 on the fixed unit 10 side as seen in the direction of the optical axis as shown in FIG. 4A, and the ball 40 moves in a direction perpendicular to each of the optical axis L and the rotational axis TC2 (a horizontal direction as viewed in FIG. 4B).

The ball 40 moves while rolling on the rolling surface 42 with rotation of the movable unit 30, and movement of the ball 40 is restricted by bringing it into abutment against an abutment wall 131 or an abutment wall 132 of the movement restriction unit 13. A movable range of the ball 40 at this time is referred to as a first moving range Tb1. On the other hand, rotation of the movable unit 30 is restricted by bringing the rotation restricted unit 32 of the movable unit 30 into abutment against a rotation restriction unit 12 of the fixed unit 10. A rotatable range of the movable unit 30 at this time is referred to as a first rotational range T1.

Referring next to FIG. 4C, when the movable unit 30 rotates about the rotational axis TC1 perpendicular to the rotational axis TC2, the ball 40 moves in a direction perpendicular to the direction in which the ball 40 moves within the first moving range Tb1.

The ball 40 moves while rolling on the rolling surface 42 on the fixed unit 10 side, and movement of the ball 40 is restricted by bringing it into abutment against an abutment wall 133 or an abutment wall 134 of the movement restriction unit 13. A movable range of the ball 40 at this time is referred to as a second moving range Tb2. On the other hand, as with the case in FIG. 4B, rotation of the movable unit 30 is restricted by bringing the rotation restricted unit 32 of the movable unit 30 into abutment against the rotation restriction unit 12 of the fixed unit 10. A rotatable range of the movable unit 30 at this time is referred to as a second rotational range T2.

Here, in the present embodiment, in a case where the movable unit 30 is rotated throughout the rotatable range, the relationship between the rotatable range 30 and the movable range of the ball 40 is determined so that the ball 40 can move throughout the movable range. The relationship between the rotatable range 30 and the movable range of the ball 40 is the same as the relationship between the above equation (5) and the above equation (6) and thus expressed by an equation (8) and an equation (9) below.

$$Tb1/T1 = R2 \cdot \cos(S)/2 \quad (8)$$

$$Tb2/T2 = R2/2 \quad (9)$$

When the expression $\cos(S)<1$ is applied to the above equation (8) and the above equation (9) similar to the above equation (7), an equation (10) below holds.

$$Tb1/T1 < Tb2/T2 \quad (10)$$

In the above equation (10), Tb1/T1 designates a ratio of the first moving range Tb1 of the ball 40 to the first rotational range T1 of the movable unit 30 rotating about the rotational axis TC2 coinciding with the center of the rolling surface 42 on the fixed unit 10 side as viewed in the direction of the optical axis L, and this ratio is referred to as a first ratio P1. Tb2/T2 designates a ratio of the second moving range Tb2 of the ball 40 to the second rotational range T2 of the movable unit 30 rotating about the rotational axis TC1 perpendicular to the rotational axis TC2, and this ratio is referred to as a second ratio P2.

As is clear from the above equation (10), the second ratio P2 is greater than the first ratio P1. Moreover, in the present embodiment, the second ratio P2 is set to a half of the distance R2 according to the above equation (9). Namely, the second ratio P2 is set to a half of the distance R2 which is a distance from the center of the rotational axis TC1 to the center of the ball 40.

Thus, when the movable unit 30 rotates in the second rotational range T2, the ball 40 accordingly moves in the second moving range Tb2. As a result, an initial position of the ball 40 is caused to fall within a predetermined range by performing a resetting operation, to be described later, and variations in the performance of image stabilization apparatus 100 with surface accuracy of the rolling surface 42 are reduced.

Figure 5:
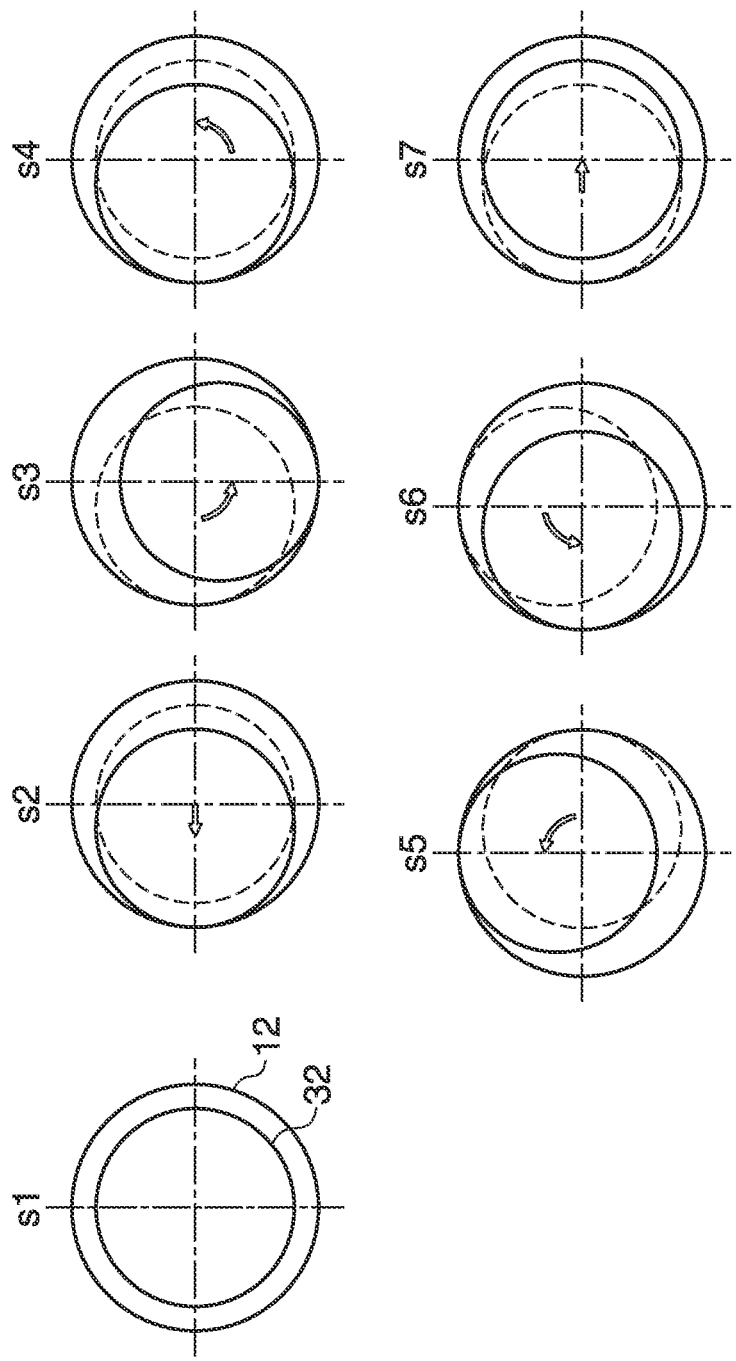
FIG. 5 is a conceptual diagram useful in explaining how a center of a rotation restricted unit moves with rotation of a movable unit during a resetting operation.
Figure 6A:
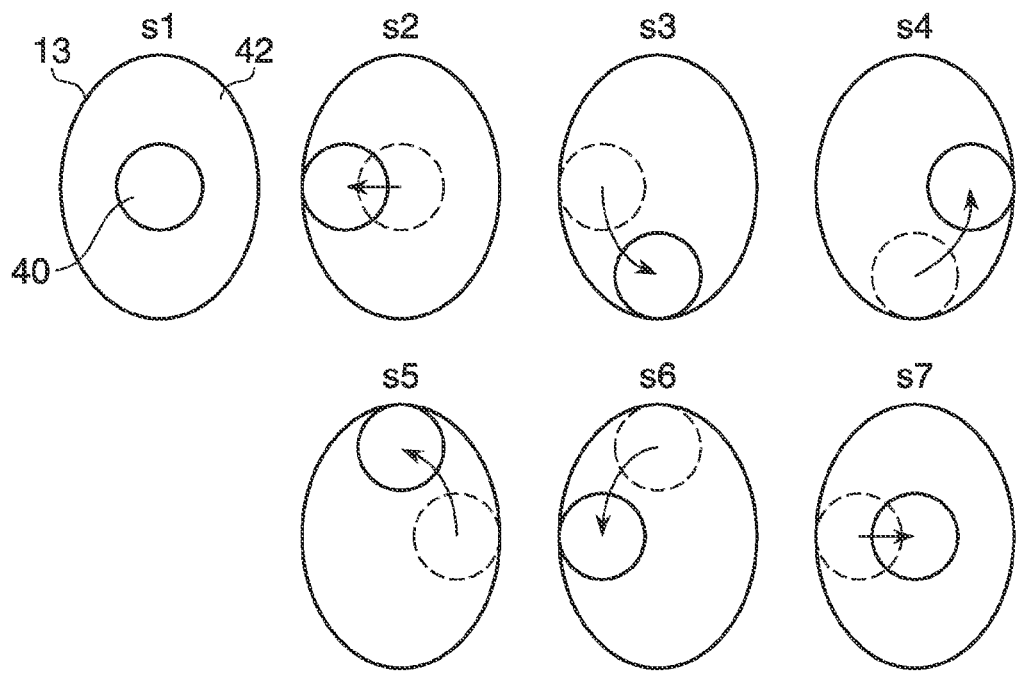
FIGS. 6A and 6B are conceptual diagrams showing a motion of a ball, which moves on a rolling surface on a fixed unit side with rotation of the movable unit during a resetting operation, as seen in the direction of the normal to the rolling surface.
Figure 6B:
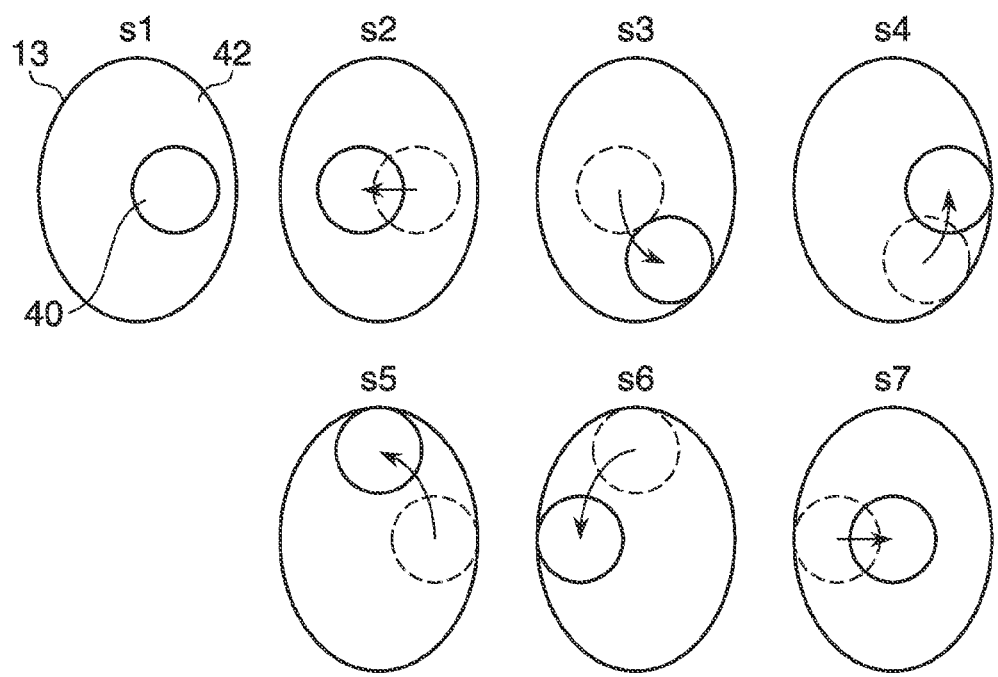

Referring next to FIGS. 5, 6A, and 6B, a description will be given of a resetting operation for keeping a position of the ball 40 within a predetermined range. When the movable unit 30 rotates during an image stabilizing operation, the ball 40 moves as described above. Usually, the ball 40 rolls between the rolling surface 42 on the fixed unit 10 side and the rolling surface 41 on the movable unit 30 side to reduce frictional resistance which develops when the movable unit 30 rotates.

when the ball 40 comes into contact with the movement restriction unit 13, however, the ball 40 cannot roll any longer, and hence slippage occurs between the rolling surface 42 on the fixed unit 10 side or the rolling surface 41 on the movable unit 30 side and the ball 40. In general, slippage has a higher frictional resistance than that of rolling and is thus a factor that interferes with rotation of the movable unit 30.

To cope with this, a resetting operation described hereafter is carried out so as to prevent the ball 40 from coming into contact with the movement restriction unit 13 while the movable unit 30 is rotating. This resetting operation is considered to be carried out when the power to electronic equipment including an image pickup apparatus such as a digital camera equipped with the image stabilization apparatus 100 is turned on, or carried out at predetermined time intervals.

FIG. 5 is a conceptual diagram useful in explaining how a center of the rotation restricted unit 32 moves with rotation of the movable unit 30. FIGS. 6A and 6B are conceptual diagrams showing motion of the ball 40, which moves on the rolling surface 42 on the fixed unit 10 side with rotation of the movable unit 30, FIG. 6A showing a normal state, and FIG. 6B showing a state in which an impact is externally given. It should be noted that s1 to s7 in FIG. 5 designate timings in chronological order, and the timings s1 to s7 in FIG. 5 correspond to timings s1 to s7 in FIGS. 6A and 6B.

At the start of the resetting operation, first, the rotation restricted unit 32 is positioned in a midsection of the rotation restriction unit 12 with the timing s1 in FIG. 5. After the resetting operation is started, the rotation restricted unit 32 moves to a position with the timing s2 in FIG. 5 and comes into abutment against the rotation restriction unit 12. After that, with the timings s3 to S6 in FIG. 5, the rotation restricted unit 32 moves in a circle in the state of being in abutment against the rotation restriction unit 12. At last, with the timing s7 in FIG. 5, the rotation restricted unit 32 comes back to the midsection of the rotation restriction unit 12 to complete the resetting operation.

Referring to FIGS. 6A to 6B, a description will be given of how the ball 40 moves at this time. Before the resetting operation, the ball 40 is positioned in the midsection of the rolling surface 42 on the fixed unit 10 side with the timing s1 in FIG. 6A. When rotation of the movable unit 30 is started by the resetting operation, the ball 40 moves toward the movement restriction unit 13 and comes into a state of the timing s2 in FIG. 6A.

As described earlier, the ball 40 is configured to move throughout the movable range when the movable unit 30 is rotated throughout the rotatable range. For this reason, when the movement restricted unit 32 comes into contact with the rotation restriction unit 12, the ball 40 is in contact with the movement restriction unit 13 or has moved to a position immediately before it comes into contact with the movement restriction unit 13.

After that, with the timings s3 to s6 in FIG. 5, when the movable unit 30 moves in a circle throughout the whole area while the rotation restricted unit 32 is in contact with the rotation restriction unit 12, the ball 40 moves in a circle in a state of being in contact with the movement restriction unit 13 or a state immediately before it comes into the movement restriction unit 13 with the timings s3 to s6 in FIG. 6A. At last, when the rotation restricted unit 32 comes back to the midsection with the timing s7 in FIG. 5, the ball 40 comes back to the midsection with the timing s7 in FIG. 6A. This completes the resetting operation.

Referring next to FIG. 6B, a description will be given of how the ball 40 behaves when an impact or the like is externally given to the image stabilization apparatus 100. When an impact or the like is externally given to the image stabilization apparatus 100, the ball 40 may be displaced from the center of the rolling surface 42 with the timing s1 in FIG. 6B although the rotation restricted unit 32 lies at the center of the rotatable range (the timing s1 in FIG. 5).

In this case, when the resetting operation is started, the ball 40 moves with rotation of the rotation restricted unit 32 and comes into a state of the timing s2 in FIG. 6B. At this time, since the ball 40 did not lie at the center in its initial state, the ball 40 stops at such a position as not to be in contact with the movement restriction unit 13.

The ball 40 goes from a state of the timing s3 to a state of the timing s4 in FIG. 6B in synchronization with circular movement of the rotation restricted unit 32 of the movable unit 30 and comes into contact with the movement restriction unit 13 while circular movement of the rotation restricted unit 32 is under way, and slips on the abutting surface of the movement restriction unit 13 to absorb the rotation of the movable unit 30. After that, the ball 40 goes into states indicated by the timings s5 and s6 in FIG. 6B in synchronization with circular movement of the rotation restricted unit 32. At last, when the rotation restricted unit 32 comes back to the midsection with the timing s7 in FIG. 5, the ball 40 comes back to the midsection with the timing s7 in FIG. 6B.

As described above, even if the ball 40 does not lie in the midsection of the rolling surface 42 in its initial state, the ball 40 is brought back to the midsection of the rolling surface 42 by performing the resetting operation. It should be noted that although in the example described above, the ball 40 is displaced from its initial position, but even when the ball 40 is displaced from a position other than its initial position, the ball 40 is brought back to the midsection of the rolling surface 42 after the resetting operation.

Figure 7A:
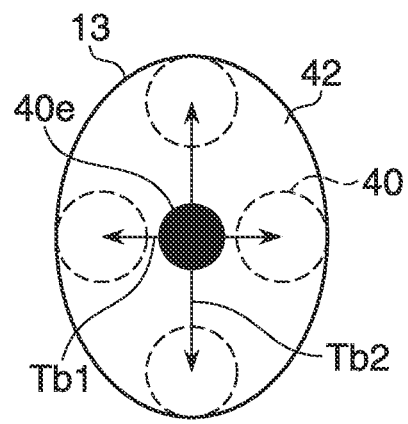
FIG. 7A is a conceptual diagram showing the relationship between the rolling surface and the ball according to the present invention as seen in a direction of the normal to the rolling surface.

Referring next to FIG. 7A, a description will be given of a comparison between the present invention and the prior art. FIG. 7A is a conceptual diagram showing the relationship between the rolling surface 42 and the ball 40 according to the present invention as seen in the direction of the normal to the rolling surface 42, and FIG. 7B is a conceptual diagram showing the relationship between a rolling surface 542 and the ball 40 according to the prior art as seen in the direction of the normal to the rolling surface 542.

Referring first to FIG. 7A, a description will be given of the present invention. The rotatable range of the movable unit 30 during the resetting operation is uniform in all directions as described earlier with reference to FIG. 5. Therefore, according to the present invention, the second moving range Tb2 is wider than the first moving range Tb1 as shown in FIG. 7A. This is because settings are configured with consideration given to that the amount of movement of the ball 40 varies with directions of the rotational axis of the movable unit 30.

Next, a description will be given of an initial position of the ball 40 after the resetting operation. The initial position of the ball 40 should always be at a point in the midsection of the rolling surface 42 on the fixed unit 10 side as long as the movement restriction unit 13, which restricts movement of the ball 40, is formed while the relationship represented by the above equation (8) and the above equation (9) is maintained. However, when the first moving range Tb1 and the second moving range Tb2 of the ball 40 are each set to be a little wide with consideration given to a manufacturing error or the like, the initial position of the ball 40 falls within a range 40e in FIG. 7A, not at the point in the midsection. Namely, the range 40e is a range within which the initial position of the ball 40 falls after the resetting operation.

Figure 7B:
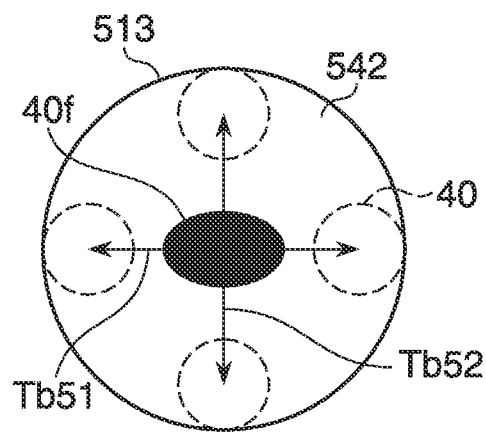
FIG. 7B is a conceptual diagram showing the relationship between a rolling surface and a ball according to a prior art as seen in the direction of the normal to the rolling surface.

Referring next to FIG. 7B, a description will be given of the prior art. According to the prior art, a moving range of the ball 40 in directions perpendicular to each other in the rolling surface 42 is expressed by Tb51=Tb52 as shown in FIG. 7B. Thus, movable ranges of the ball 40 in directions perpendicular to each other are the same, and the first ratio P1 and the second ratio P2 are the same. The moving range Tb52 at this time is the same as the second moving range Tb2 of the present invention (Tb52=Tb2). When a movement restriction unit 513 is formed under such conditions, the initial position of the ball 40 after the resetting operation according to the prior art falls within an oval range 40f which is longer than the range 40e of the present invention in the direction of the moving range Tb51.

This is because the amount by which the ball 40 moves in the direction of the moving range Tb51 during the resetting operation is smaller than that in the direction of the moving range Tb52, and hence a position to which the ball 40 comes back is unstable due to slippage of the ball 40. As a result, in the direction of the moving range Tb51, the range of the initial position of the ball 40 after the resetting operation is wide as compared to the present invention. Thus, image stabilization is likely to be affected by, for example, unevenness of the rolling surface 542, and hence performance greatly varies with surface accuracy.

As described above, according to the present embodiment, in the image stabilization apparatus 100 which rotates about the rotational axe TC1 and TC2 perpendicular to the optical axis L through rolling of the ball 40, the initial position of the ball 40 after the resetting operation is kept within a narrow range. This reduces variations in performance with surface accuracy of the rolling surface 42.

Figure 8A:
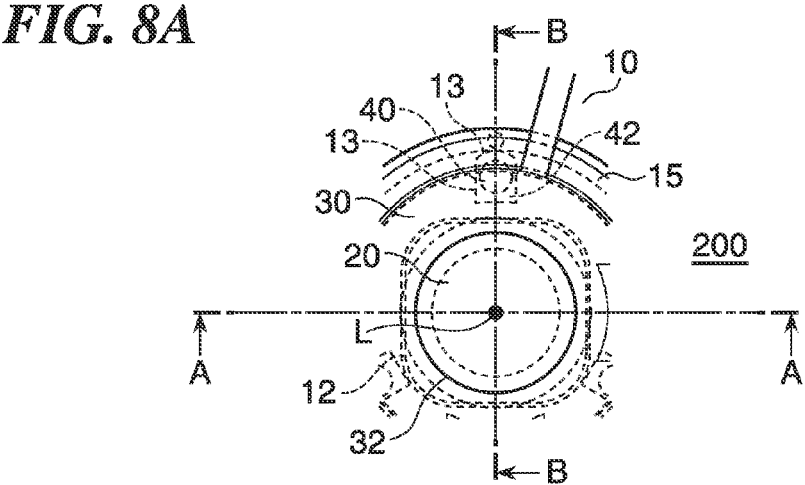
FIG. 8A is a view showing in part an image stabilization apparatus according to a second embodiment of the present invention as seen in a direction of an optical axis.
Figure 8B:
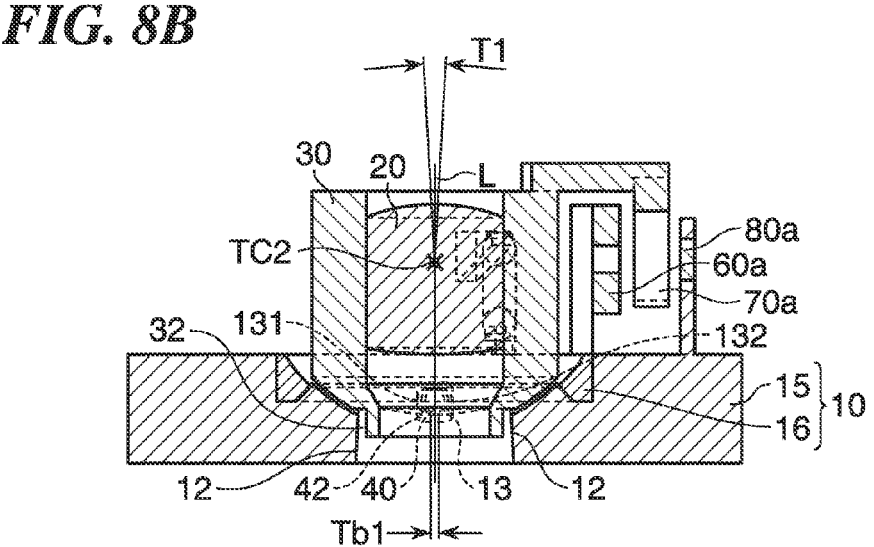
FIG. 8B is a cross-sectional view of FIG. 8A taken along line A-A of FIG. 8A.
Figure 8C:
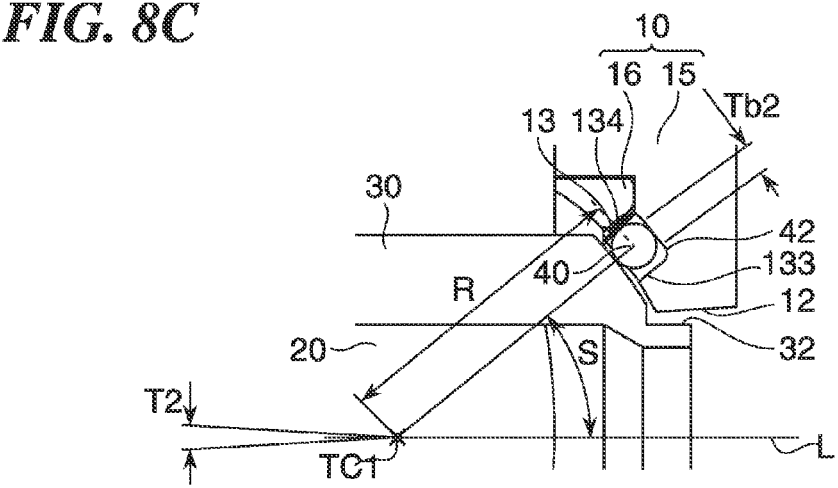
FIG. 8C is a cross-sectional view of FIG. 8A taken along line B-B of FIG. 8A.

Referring next to FIGS. 8A to 8C and 9, a description will be given of an image stabilization apparatus according to a second embodiment of the present invention. FIG. 8A is a view showing in part the image stabilization apparatus 200 according to the second embodiment of the present invention as seen in a direction of an optical axis, FIG. 8B is a cross-sectional view of FIG. 8A taken along line A-A of FIG. 8A, and FIG. 8C is a cross-sectional view of FIG. 8A taken along line B-B of FIG. 8A. It should be noted that portions overlapping or equivalent to those in the above described first embodiment will be described using the same reference numerals in the figures.

As shown in FIG. 8A, the image stabilization apparatus 200 according to the present embodiment is constructed such that the rotation restriction unit 12 of the movable unit 30 has a substantially rectangular shape as seen in the direction of the optical axis L. Therefore, rotation of the movable unit 30 is restricted along an inner peripheral surface comprised of four straight-line portions of the rotation restriction unit 12 that is substantially rectangular.

This means that even when the movable unit 30 is rotating about the rotational axis TC2, a range in which the movable unit 30 is rotatable about the rotational axis TC1 is kept constant. For this reason, when, for example, an accurate rotatable range of the movable unit 30 is desired to be grasped of so as to adjust sensitivities of the magnetic sensors 80a and 80b, rotatable ranges about the respective rotational axes TC1 and TC2 are detected with accuracy.

A description will now be given of the movement restriction unit 13 which restricts movement of the ball 40. As with the rotation restriction unit 12, the movement restriction unit 13 as well has a rectangular shape having four straight-line portions. The movement restriction unit 13 is comprised of a wall substantially perpendicular to a direction in which the ball 40 moves. As a result, a force (component force) to float above the rolling surface 42 on the fixed portion 10 side is hardly generated after the ball 40 comes into abutment against the movement restriction unit 13, and hence when the resetting operation described above is to be performed, the position of the ball 40 is kept within a predetermined range by causing a slip of the ball 40 to occur on purpose.

The ball 40 comes into abutment against the movement restriction unit 13 which is substantially perpendicular to the direction in which the ball 40 moves, and hence assuming that the movement restriction unit 13 is comprised of an integral unit, a part of the movement restriction unit 13 has an undercut shape as seen in the direction of the optical axis L. In this case, to produce the fixed portion 10 as a resin molded product, a complicated die such as a die of a sliding type is needed.

Therefore, in the present embodiment, the fixed unit 10 is comprised of a combination of a base member 15 and a cover member 16. The movement restriction unit 13 extends over the base member 15 and the cover member 16. As a result, the fixed unit 10 is allowed to be made using a simple die without causing the rectangular movement restriction unit 13 to have an undercut shape.

Since the movement restriction unit 13 is comprised of a plurality of different members (the base member 15 and the cover member 16), the ball 40 is prevented from floating above the rolling surface 42, the position of the ball 40 is kept within a predetermined range, and variations in performance with surface accuracy of the rolling surface 42 are reduced.

Figure 9:
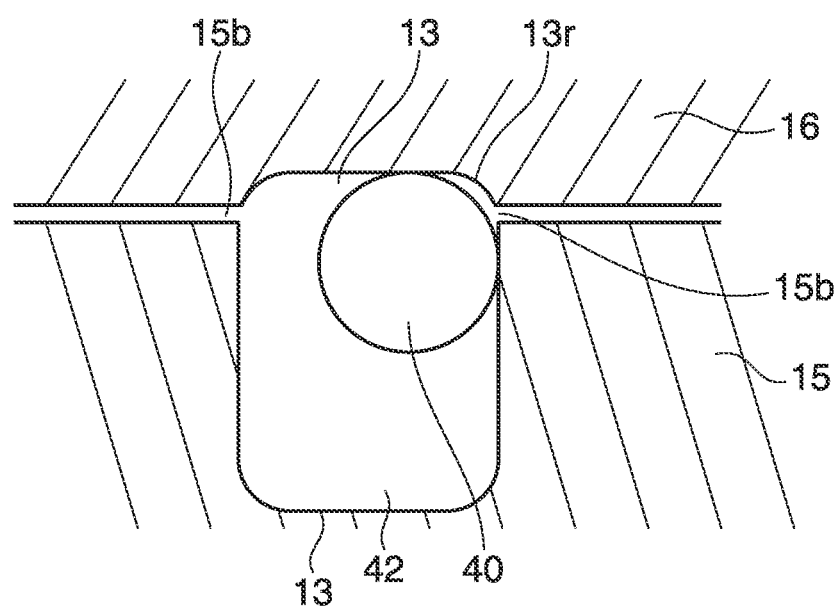
FIG. 9 is a schematic diagram showing a part of a rolling surface on a fixed unit side as seen in the direction of the normal to the rolling surface.

Referring next to FIG. 9, a detailed description will be given of a shape of the movement restriction unit 13. FIG. 9 is a schematic diagram showing a part of the rolling surface 42 on the fixed unit 10 side as seen in the direction of the normal to the rolling surface 42. It should be noted that FIG. 9 shows a state where the ball 40 has moved to a corner of the rectangular movement restriction unit 13.

In the state shown in FIG. 9, the ball 40 is in abutment against both the base member 15 and the cover member 16 of the movement restriction unit 13. At this time, a boundary portion 15b between the base member 15 and the cover member 16 is positioned such that the ball 40 is not in contact with the boundary portion 15b. As a result, even if a step develops at the boundary 15b between the base member 15 and the cover member 16, the ball 40 smoothly moves without coming into contact with the step. The other constitution and operational advantages are the same as those of the first embodiment described above.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-115594, filed Jun. 8, 2015 which is hereby incorporated by reference herein in its entirety.

What is claimed is:

1. An image stabilization apparatus comprising:
a fixed unit;
a movable unit configured to hold an optical element and be supported so as to be rotatable about a first rotational axis, which is perpendicular to an optical axis of the optical element, and a second rotational axis, which is perpendicular to the optical axis and perpendicular to the first rotational axis, with respect to said fixed unit through a plurality of rolling members;
a rotation restriction unit configured to be provided in said fixed unit and restrict rotation of said movable unit; and
a movement restriction unit configured to be provided around a rolling surface for the rolling members and restrict movement of the rolling members,
wherein in a state where the second rotational axis coincides with a center of the rolling surface as seen in a direction of the optical axis, assuming that a range over which the rolling members are movable before said movement restriction unit restricts movement of the rolling members moving in a direction of the first rotational axis is a first moving range, and a range over which said movable unit is rotatable before said rotation restriction unit restricts rotation of said movable unit about the second rotational axis is a first rotational range,
a range over which the rolling members are movable before said movement restriction unit restricts movement of the rolling members moving in a direction perpendicular to a direction of the first moving range is a second moving range, and a range over which said movable unit is rotatable before said rotation restriction unit restricts rotation of said movable unit about the first rotational axis is a second rotational range, and
a ratio of the first moving range to the first rotational range is a first ratio, and a ratio of the second moving range to the second rotational range is a second ratio, the second ratio is greater than the first ratio.

2. The image stabilization apparatus according to claim 1, wherein the second ratio is set to be a half of a distance from a center of the first rotational axis to the center of the rolling member.

3. The image stabilization apparatus according to claim 1, wherein the rolling surface is shaped like a sphere, a center of which is an intersection of the first rotational axis and the second rotational axis passing through the optical axis.

4. The image stabilization apparatus according to claim 1, wherein said movement restriction unit comprises a plurality of different members.

5. The image stabilization apparatus according to claim 4, wherein a boundary portion between the plurality of different members is disposed at such a location that the rolling members rolling on the rolling surface do not come into contact with the boundary portion.

6. The image stabilization apparatus according to claim 1, wherein the rolling members are balls.

7. The image stabilization apparatus according to claim 1, wherein said movement restriction unit has a substantially rectangular shape as seen in a direction of the optical axis.

8. The image stabilization apparatus according to claim 1, wherein the rolling surface is formed in said fixed unit.

9. An image stabilization apparatus, comprising:
a fixed unit;
a movable unit configured to hold an optical element and be supported so as to be rotatable about a first rotational axis and a second rotational axis, which are not parallel to an optical axis of the optical element, with respect to said fixed unit through a plurality of rolling members;
a rotation restriction unit configured to be provided in said fixed unit and restrict rotation of said movable unit; and
a movement restriction unit configured to be provided around a rolling surface for the rolling members and restrict movement of the rolling members,
wherein assuming that a range over which said movable unit, rotation of which is restricted by said rotation restriction unit, is rotatable about the second rotational axis is a first rotational range,
a range over which the rolling members, movement of which is restricted by said movement restriction unit, is movable in a rotational direction of said movable unit about the second rotational axis is a first moving range,
a range over which said movable unit, rotation of which is restricted by said rotation restriction unit, is rotatable about the first rotational axis is a second rotational range, and
a range over which the rolling members, movement of which is restricted by said movement restriction unit, is movable in a rotational direction of said movable unit about the first rotational axis is a second moving range,
said rotation restriction unit and said movement restriction unit are provided so that a first ratio which is a ratio of the first moving range to the first rotational range is different from a second ratio which is a ratio of the second moving range to the second rotational range.

10. The image stabilization apparatus according to claim 9, wherein assuming that, as seen from a direction of the optical axis, a rotational axis which coincides with the rolling surface is defined as the second rotational axis and a rotational axis which does not coincide with the rolling surface is defined as the first rotational axis, said rotation restriction unit and said movement restriction unit are provided so that the second ratio is greater than the first ratio.

11. The image stabilization apparatus according to claim 9, wherein the second rotational axis is perpendicular to the first rotational axis.

12. The image stabilization apparatus according to claim 9, wherein the first rotational axis and the second rotational axis are perpendicular to the optical axis.

13. The image stabilization apparatus according to claim 9,
wherein an intersection of the first rotational axis and the second rotational axis exists on the optical axis, and
wherein the rolling surface is shaped like a sphere, a center of which is the intersection.

14. An optical device, comprising:
a fixed unit;
a movable unit configured to hold an optical element and be supported so as to be rotatable about a first rotational axis perpendicular to an optical axis of the optical element and a second rotational axis perpendicular to the optical axis and perpendicular to the first rotational axis, with respect to said fixed unit through a plurality of rolling members;
a rotation restriction unit configured to be provided in the fixed unit and restrict rotation of said movable unit; and
a movement restriction unit configured to be provided around a rolling surface for the rolling members and restrict movement of the rolling members,
wherein in a state where the second rotational axis coincides with a center of the rolling surface as seen in a direction of the optical axis, assuming that a range over which the rolling members are movable before said movement restriction unit movement of the rolling members moving in a direction of the first rotational axis is a first moving range, and
a range over which said movable unit is rotatable before said rotation restriction unit restricts rotation of said movable unit about the second rotational axis is a first rotational range,
a range over which the rolling members are movable before said movement restriction unit restricts movement of the rolling members moving in a direction perpendicular to a direction of the first moving range is a second moving range, and a range over which said movable unit is rotatable before said rotation restriction unit restricts rotation of said movable unit about the first rotational axis is a second rotational range, and
a ratio of the first moving range to the first rotational range is a first ratio, and a ratio of the second moving range to the second rotational range is a second ratio, the second ratio is greater than the first ratio.

15. An optical device, comprising:
a fixed unit;
a movable unit configured to hold an optical element and be supported so as to be rotatable about a first rotational axis and a second rotational axis, which are not parallel to an optical axis of the optical element, with respect to said fixed unit through a plurality of rolling members;
a rotation restriction unit configured to be provided in said fixed unit and restrict rotation of said movable unit; and
a movement restriction unit configured to be provided around a rolling surface for the rolling members and restrict movement of the rolling members,
wherein assuming that a range over which said movable unit, rotation of which is restricted by said rotation restriction unit, is rotatable about the second rotational axis is a first rotational range,
a range over which the rolling members, movement of which is restricted by said movement restriction unit, is movable in a rotational direction of said movable unit about the second rotational axis is a first moving range, a range over which said movable unit, rotation of which is restricted by said rotation restriction unit, is rotatable about the first rotational axis is a second rotational range, and a range over which the rolling members, movement of which is restricted by said movement restriction unit, is movable in a rotational direction of said movable unit about the first rotational axis is a second moving range, said rotation restriction unit and said movement restriction unit are provided so that a first ratio which is a ratio of the first moving range to the first rotational range is different from a second ratio which is a ratio of the second moving range to the second rotational range.

* * * * *